United States Patent
Neale

(10) Patent No.: US 9,947,043 B2
(45) Date of Patent: Apr. 17, 2018

(54) SMART FORM

(75) Inventor: Michael D. Neale, Faulconbridge (AU)

(73) Assignee: Red Hat, Inc., Raleigh, NC (US)

( * ) Notice: Subject to any disclaimer, the term of this patent is extended or adjusted under 35 U.S.C. 154(b) by 807 days.

(21) Appl. No.: 12/501,978

(22) Filed: Jul. 13, 2009

(65) Prior Publication Data

US 2011/0010202 A1    Jan. 13, 2011

(51) Int. Cl.
*G06Q 40/00* (2012.01)
*G06N 5/02* (2006.01)
*G06Q 40/08* (2012.01)

(52) U.S. Cl.
CPC ............ *G06Q 40/00* (2013.01); *G06N 5/025* (2013.01); *G06Q 40/08* (2013.01)

(58) Field of Classification Search
CPC ............... G06Q 40/00; G06Q 30/0241; G06Q 30/0251; G06Q 40/08; G06N 5/025
USPC .......................................... 705/35, 7.11, 7.29
See application file for complete search history.

(56) References Cited

U.S. PATENT DOCUMENTS

| | | | |
|---|---|---|---|
| 7,096,193 B1* | 8/2006 | Beaudoin et al. | 705/26.1 |
| 2002/0059283 A1* | 5/2002 | Shapiro et al. | 707/100 |
| 2002/0146676 A1* | 10/2002 | Reynolds | G09B 5/00 434/362 |
| 2003/0187703 A1* | 10/2003 | Bonissone et al. | 705/4 |
| 2004/0059705 A1* | 3/2004 | Wittke | G06N 5/00 |
| 2004/0176995 A1* | 9/2004 | Fusz | 705/10 |
| 2005/0266387 A1* | 12/2005 | Rossides | G09B 7/00 434/323 |
| 2006/0240851 A1* | 10/2006 | Washburn | H04L 12/1859 455/466 |
| 2007/0067197 A1* | 3/2007 | Bushey | 705/8 |
| 2007/0250783 A1* | 10/2007 | Wu | G06F 17/243 715/762 |
| 2008/0228857 A1* | 9/2008 | Ostertag et al. | 709/201 |
| 2009/0216772 A1* | 8/2009 | Goldfarb | 707/10 |
| 2009/0326999 A1* | 12/2009 | Duke | 705/7 |
| 2010/0070448 A1* | 3/2010 | Omoigui | H01L 27/1463 706/47 |
| 2012/0288844 A1* | 11/2012 | Anand | G09B 7/08 434/353 |

OTHER PUBLICATIONS

Neale, Michael, "Introducing a new smart forms tool: Drools Advisor", accessed at: http://blog.athico.com/2009/06/introducing-new-smart-forms-tool-drools.html, posted Jul. 2, 2009, accessed Jul. 17, 2009, 7 pages.

"Problem Solving and Truth Maintenance Systems", accessed at: http://www.cis.temple.edu/~ingargio/cis587/readings/tms.html, Jun. 5, 2009, 8 pages.

* cited by examiner

*Primary Examiner* — Lalita M Hamilton
(74) *Attorney, Agent, or Firm* — Lowenstein Sandler LLP

(57) ABSTRACT

Some embodiments of a system and a method to dynamically create a smart form have been presented. In one embodiment, a graphical user interface (GUI) module, running on a server, creates a GUI to present a questionnaire having at least one question to an end-user. A rule engine, running on the server, receives an answer to the at least one question via the GUI from the end-user. Using truth maintenance, the rule engine may determine what follow-up questions to ask the end-user based on the answer received. The GUI module may dynamically modify the GUI to present the follow-up questions to the end-user.

20 Claims, 7 Drawing Sheets

130

1. Passport number
Nationality as shown on passport
Family name
Given or first names
Date of birth
Occupation or job
Full contact or residential address in NZ
Country of birth
Overseas port where you will leave THIS aircraft/ship 2. Which country will you next live in for 12 months or more?
☐ NZ or ▢

3. Do you live in NZ, or did you until today? ⦿ Yes ○ No
I have lived in NZ for: ○ 12 months or more ○ less than 12 months ▢ Days
How long will you be away from NZ? ☐ permanently or ▢
What is the MAIN purpose of your trip? ▢
Which country will you spend most time in while overseas? ▢

FIG. 1C

Full contact or residential address in NZ

Country of birth

Overseas port where you will leave THIS aircraft/ship

2. Which country will you next live in for 12 months or more?  — 141

☐ NZ or ▭

3. Do you live in NZ, or did you until today?   — 142

○ Yes ● No  ▭

On this visit I have been in New Zealand for a period of:

[Days] — 144

4. Date of departure   04/06/2009

SMART FORM

TECHNICAL FIELD

Embodiments of the present invention relate to rule management, and more specifically to dynamically creating a smart form using a rule engine and truth maintenance.

BACKGROUND

Questionnaires, which broadly refer to collections of questions, have many useful applications. For example, questionnaires may be used in surveys to collect data for analysis, in various application processes (e.g., employment application, health insurance applications, housing rental application, etc.). Conventionally, questionnaires are presented in a static form. For example, a questionnaire may be printed on paper to be distributed to survey takers, applicants, etc. In another example, a questionnaire may be formatted as a webpage and displayed.

However, because of the static form, all possible questions in the questionnaire have to be included, even though some of these questions may later become irrelevant in certain cases. For example, an exemplary conventional questionnaire may include different questions for male and female survey takers. For the questionnaire given to a male survey taker, all questions directed to female survey takers become irrelevant. But since the static form has to be generated prior to a survey taker answering any of the questions, including the question on his/her gender, all possible questions have to be included in the questionnaire, thus making the questionnaire unnecessarily long and potentially confusing to the survey taker. The chance of the survey taker inadvertently making a mistake is also greatly increased if the survey taker changes his/her answer to one of the earlier questions because the survey taker may likely forget to answer the relevant set of follow-up questions after changing the answer. As a result, the data of interest may not be collected.

BRIEF DESCRIPTION OF THE DRAWINGS

The present invention is illustrated by way of example, and not by way of limitation, in the figures of the accompanying drawings and in which:

FIG. 1C illustrates one embodiment of a graphical user interface (GUI) of a smart form.

FIG. 1D illustrates an alternate embodiment of a GUI of a smart form.

DETAILED DESCRIPTION

Figure 1A:
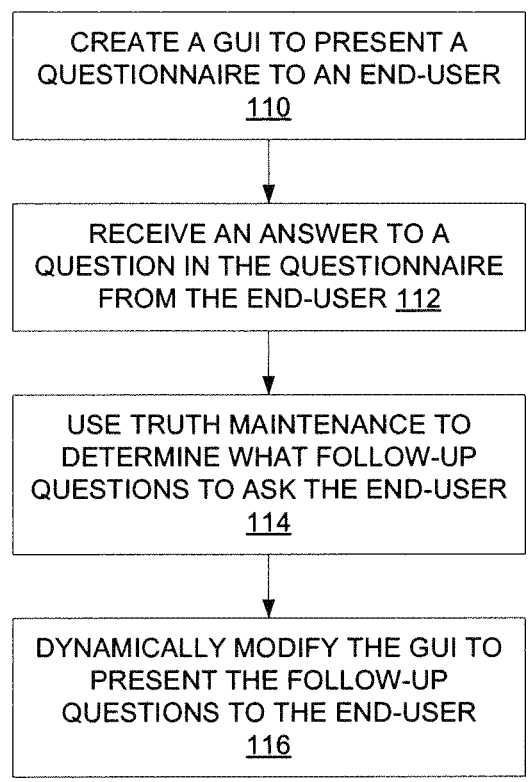
FIG. 1A illustrates a flow diagram of one embodiment of a method to dynamically create a smart form.

Described herein are some embodiments of a system and a method to dynamically create a smart form. In one embodiment, a graphical user interface (GUI) module, running on a server, creates a GUI to present a questionnaire having at least one question to an end-user. A rule engine, running on the server, receives an answer to the at least one question via the GUI from the end-user. Using truth maintenance, the rule engine may determine what follow-up questions to ask the end-user based on the answer received. The GUI module may dynamically modify the GUI to present the follow-up questions to the end-user. Because the GUI of the questionnaire is dynamically created based on the end-user's answers to questions in the questionnaire, the questionnaire may be referred to as a smart form. More details of some embodiments of the rule analysis tool are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates a flow diagram of one embodiment of a method to dynamically create a smart form. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the rule engine 210 and the GUI execution server 220 illustrated in FIG. 2 in some embodiments.

Initially, processing logic creates a GUI to present a questionnaire to an end-user (processing block 110). The questionnaire typically includes many questions and the GUI may include a form, which displays questions and provides various user interface control, such as checkboxes, text fields, drop-down lists, etc., to allow the end-user to answer the questions. In some embodiments, the questionnaire may be associated with certain business applications, such as life insurance applications, medical insurance applications, employment applications, housing rental applications, etc. Then processing logic receives an answer to a question in the questionnaire from the end-user (processing block 112).

In some embodiments, processing logic uses truth maintenance to determine what follow-up questions to ask the end-user next based on the answer received (processing block 114). To apply truth maintenance, processing logic may construct a logic tree (also known as a logic chain) having a set of nodes and a set of branches to connect the nodes. A node in the logic tree may represent a question in the questionnaire, and the branches going out of the node to other nodes may represent possible answers to the question. More details of one embodiment of a logic tree are discussed below with reference to FIG. 1B.

Then processing logic dynamically modifies the GUI to present the follow-up questions to the end-user (processing block 116). Because the questionnaire is dynamically created based on the answers from the end-user received so far, the questionnaire may be referred to as a "smart form." Some exemplary embodiments of the GUI are shown in FIGS. 1C and 1D to illustrate the above approach.

Figure 1B:
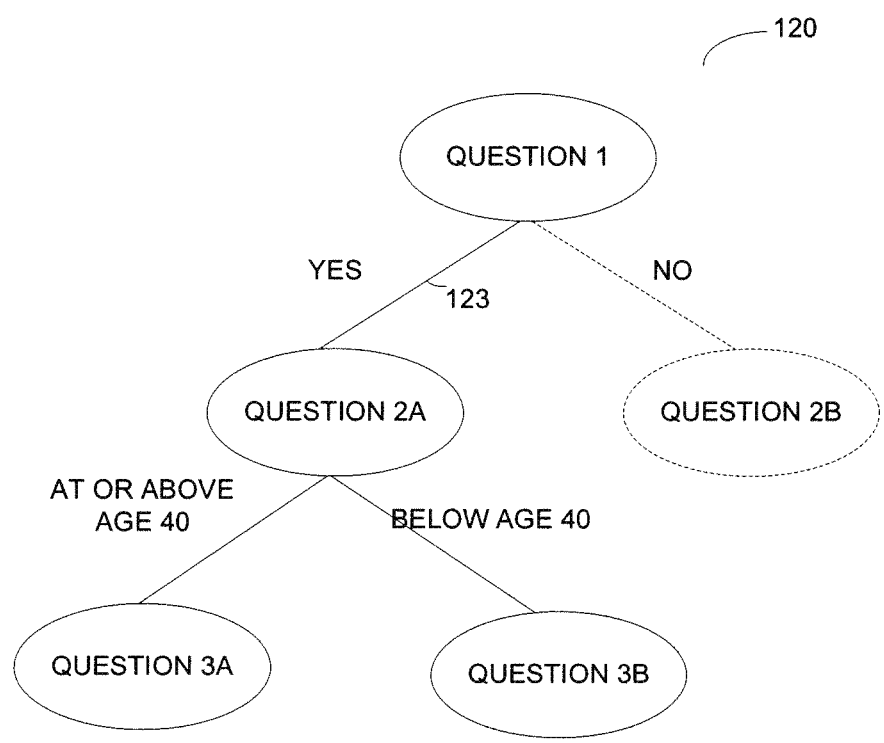
FIG. 1B illustrates an exemplary embodiment of a logic tree.

FIG. 1B illustrates one exemplary embodiment of a logic tree 120. The logic tree 120 may be associated with a life or medical insurance application form. The logic tree 120 includes a number of nodes representing various questions in the application form. For example, node designated as Question 1 may represent the question: Does/did any of your immediate family members have breast cancer? There are two branches going out of this node to connect this node to the nodes (namely, Question 2A and Question 2B) on the next level of the logic tree 120, one representing "Yes" and the other one representing "No." Each of the possible answer to this question may trigger a different set of follow-up questions. Each set of follow-up questions is logically related to the respective answer to the previous question. For the purpose of illustration, suppose the end-user's answer to this question is "Yes." Then processing logic may follow the branch 123 representing "Yes" to the node representing Question 2A. In one example, Question 2A may be: Are you above age forty (40) or not? This is because women with a family history of breast cancer may have an increased risk of having breast cancer if they are also at or above age 40. Thus, the follow-up question (i.e., Question 2A) about the age of the end-user is logically related to the end-user's answer to the previous question (i.e., Question 1). The branches going out of the node Question 2A represent the possible answers to this question, i.e., one representing at or above age 40, and the other one representing below age 40. Depending on the end-user's answer to Question 2A, processing logic may take either branch to continue to the next question (i.e., Question 3A or Question 3B). Although for simplicity, Question 1 and Question 2A illustrated in FIG. 1B each has only two possible answers, one should appreciate that some questions in some embodiments may have more than two possible answers (e.g., 3, 4, 5, etc.).

Note that because the end-user's answer to Question 1A is not "No," the portion of the logic tree 120 representing "No" and the subsequent follow-up questions has become irrelevant in this example. Thus, processing logic may discard this portion of the logic tree 120. Therefore, the branch representing "No" and the node connected to the branch, namely, Question 2B, are shown in dotted line in FIG. 1B.

As the end-user answers more and more questions in the questionnaire, processing logic may continue building the logic tree 120, which keeps track of the answers from the end-user as the logic tree 120 grows. Thus, the logic tree 120 may accumulate evidence of the end-user's response to the questions in the questionnaire, and provide a convenient way for processing logic to backtrack the sequence of answers and questions, if needed. For instance, if the end-user changes his answer to one of the earlier questions, then processing logic may backtrack the sequence of answers and questions to this earlier question, and repeat the above process to create a different questionnaire. This feature may ensure that the end-user would not forget to answer the updated relevant follow-up questions.

FIG. 1C illustrates one embodiment of a GUI 130 of a smart form. The smart form is associated with an immigration or border control survey used in New Zealand (NZ). Question 3 in the smart form 130 asks an end-user: Do you live in NZ or did you until today? The end-user's answer to Question 3 is "Yes." Because the end-user has answered yes, the smart form 130 further displays the following questions:
I have lived in NZ for:
How long will you be away from NZ?
What is the main purpose of your trip?
Which country will you spend most time in while overseas?

Note that the above follow-up questions are logically related to the fact that the end-user lives in NZ, or the end user lived in NZ until today. If the end-user has answered "No" to Question 3, then another set of follow-up questions is displayed, which is logically related to the fact that the end-user does not live in NZ, as illustrated in FIG. 1D.

FIG. 1D illustrates an alternate embodiment of the GUI 140 of the smart form. The end-user has answered "No" to Question 3 in the GUI 140, that is, the end-user does not live in NZ. Based on the end-user's answer, the GUI 140 displays a follow-up question 141 logically related to the fact that the end-user does not live in NZ: "On this visit, I have been in NZ for a period of:" and a numerical entry field 142 with a list of units 144 to allow the user to select the appropriate unit (e.g., days, weeks, months, etc.) for answering the follow-up question 141.

Figure 2:
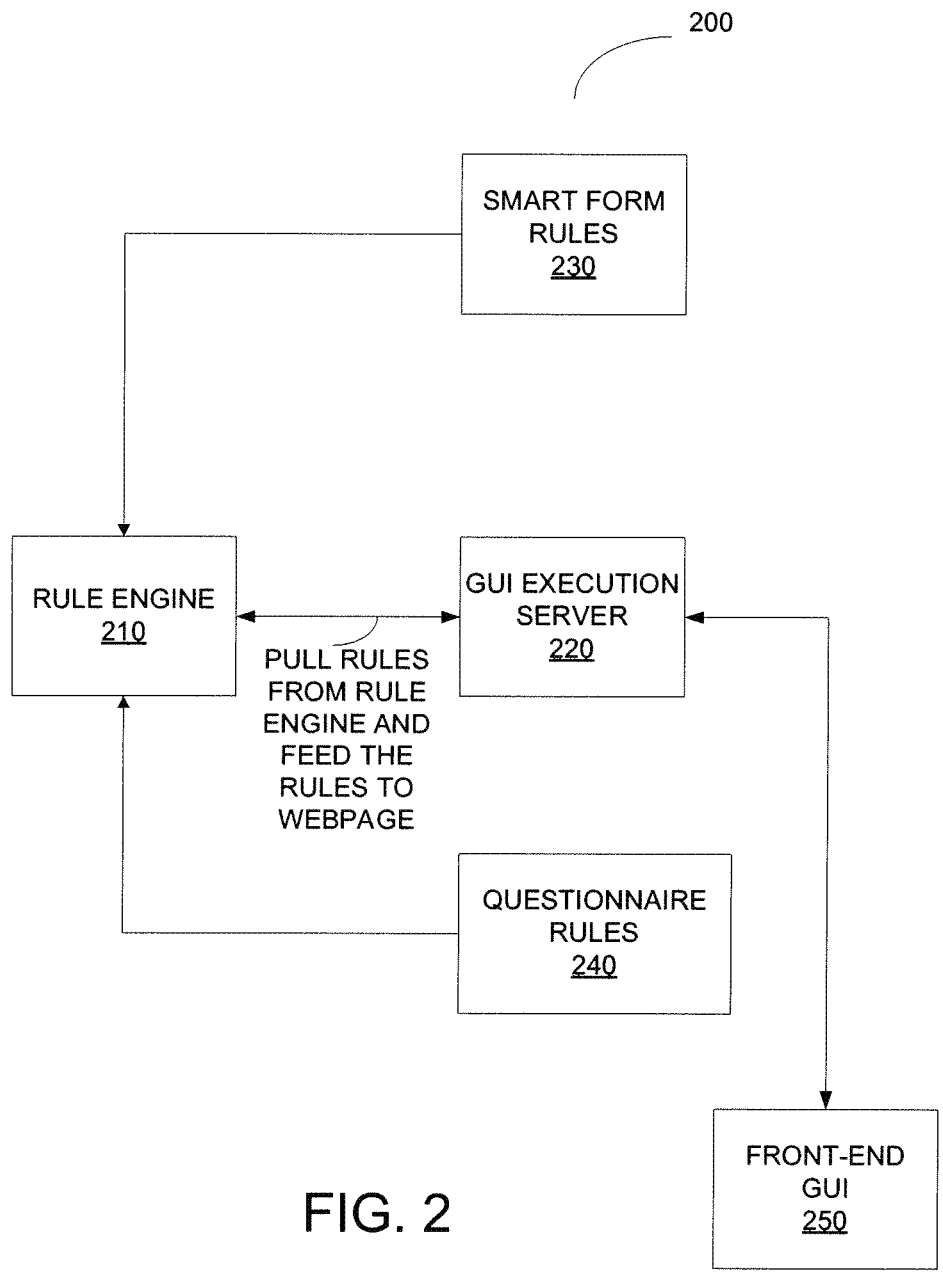
FIG. 2 illustrates one embodiment of a system to dynamically create a smart form.

FIG. 2 illustrates one embodiment of a system to dynamically create a smart form. The system 200 includes a rule engine 210 and a GUI execution server 220. In some embodiments, the rule engine 210 includes software modules running on the GUI execution server 220. Alternatively, the rule engine 210 includes software modules running on a different server communicably coupled to the GUI execution server 220. Generally speaking, the rule engine 210 receives facts asserted by users and rules, evaluate the facts against the rules, and may perform certain actions (or cause certain actions to be performed) based on the result of the evaluation. Facts as used herein broadly refer to data. Generally speaking, a rule is a logical construct for describing the operations, definitions, conditions, and/or constraints that apply to some predetermined data to achieve a goal. For example, a business rule might state that no credit check is to be performed on return customers.

In some embodiments, the rule engine 210 receives two sets of rules, namely, smart form rules 230 and questionnaire rules 240. The smart form rules 230 may govern how a smart form should be created, such as what follow-up questions to ask if a certain answer to a question is received. The questionnaire rules 240 are rules provided by the creator of the smart form. For example, the questionnaire rules 240 may include the follow-up questions associated with each possible answer of a question in the smart form.

In some embodiments, the GUI execution server 220 pulls questions from the rule engine 210 and creates a GUI of the smart form using the questions pulled. The GUI execution server 220 may include a web execution server and the GUI may include one or more webpages displayable on a client machine coupled to the web execution server. The GUI may be created in various formats, such as Hypertext Markup Language (HTML), Extended Markup Language (XML), etc. For example, the GUI execution server 220 may create a front-end GUI 250 to display a question according to one of the rules and to receive answers to the question from an end-user. When the front-end GUI 250 receives an answer to the question from the end-user, the front-end GUI 250 forwards the answer to the GUI execution server 220, which then forwards the answer to the rule engine 210.

Asserting the answer as a fact into a working memory of the rule engine 210, the rule engine 210 evaluates the answer against the rules (e.g., the smart form rules 230 and the questionnaire rules 240) in the rule engine 210. Applying the smart form rules 230 and truth maintenance, the rule engine 210 selects one or more appropriate questionnaire rules 240 as follow-up questions. The follow-up questions are logically related to the answer received. Details of some embodiments of the use of truth maintenance by the rule engine 210 have been discussed above.

The rule engine 210 then sends the follow-up questions to the GUI execution server 220. Then the GUI execution server 220 dynamically modifies the front-end GUI 250 to display the follow-up questions in the front-end GUI 250. In some embodiments, the GUI execution server 220 may further create and display user interface control (e.g., checkboxes, drop-down menus, etc.) designed for the end-user to use for answering the follow-up questions. When the front-end GUI 250 receives answers to the follow-up questions from the end-user, the front-end GUI 250, the GUI execution server 220, and the rule engine 210 repeat the above process to continue generating follow-up questions logically related to the answers for the smart form. Some exemplary embodiments of the front-end GUI 250 have been discussed above with reference to FIGS. 1C and 1D.

Figure 3:
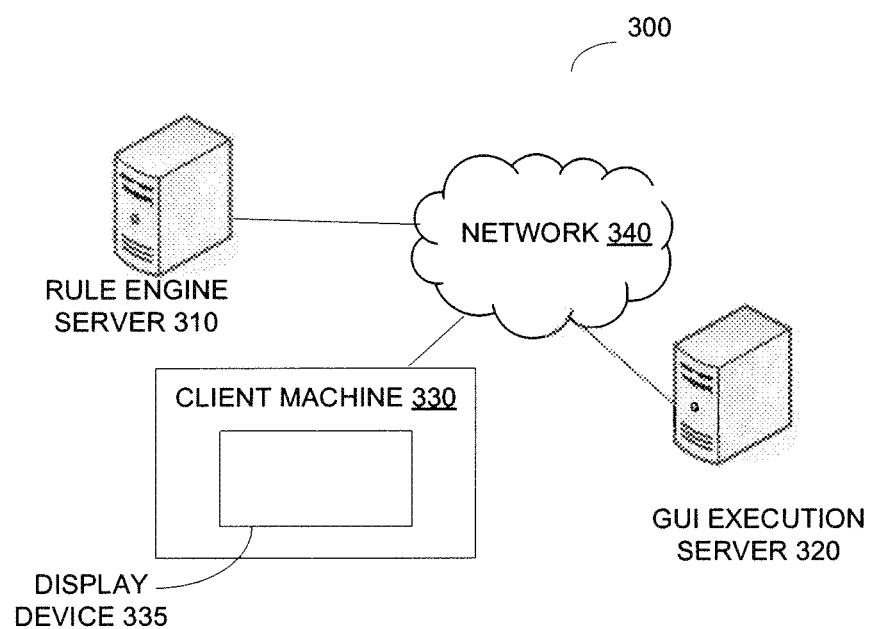
FIG. 3 illustrates one embodiment of a system to dynamically create a smart form.

FIG. 3 illustrates one embodiment of a system to dynamically create a smart form. The system 300 includes a rule engine server 310, a GUI execution server 320, and a client machine 330, coupled to each other via a network 340. The network 340 may include various networks, such as a local area network (LAN), Ethernet, wide area network (WAN), Internet, etc. Note that there may be more devices coupled to the network 340 in different embodiments, such as additional servers, client machines, etc. In an alternate embodiment, there is only one server coupled to the network 340 to perform the tasks of the rule engine server 310 and the GUI execution server 320. The client machine 330 may be implemented using various computing devices, such as personal computers, laptop computers, personal digital assistants, cellular telephone, special-purpose computers installed in kiosks, etc.

In some embodiments, the rule engine server 310 executes a rule engine, such as the rule engine 210 in FIG. 2, and the GUI execution server 320 dynamically creates a GUI of a smart form, such as the GUI execution server 220 in FIG. 2. The GUI may include various questions of the smart form, such as the exemplary embodiments shown in FIGS. 1C and 1D. The GUI execution server 320 sends the GUI created to the client machine 330, which includes a display device 335 (e.g., a monitor, a built-in screen, etc.) for displaying or rendering the GUI created. The GUI may also receive answers to the questions. Then the client machine 330 may send the answer via the network 340 to the GUI execution server 320, which forwards the answer to the rule engine server 310 via the network 340. Using truth maintenance as discussed above, the rule engine running on the rule engine server 310 selects the appropriate follow-up questions and sends the follow-up questions to the GUI execution server 320, which dynamically modifies the GUI to display these follow-up questions, and optionally, user interface control associated with these follow-up questions. Then the GUI execution server 320 sends the modified GUI to the client machine 330. The client machine 330 displays the modified GUI using the display device 335.

Figure 4:
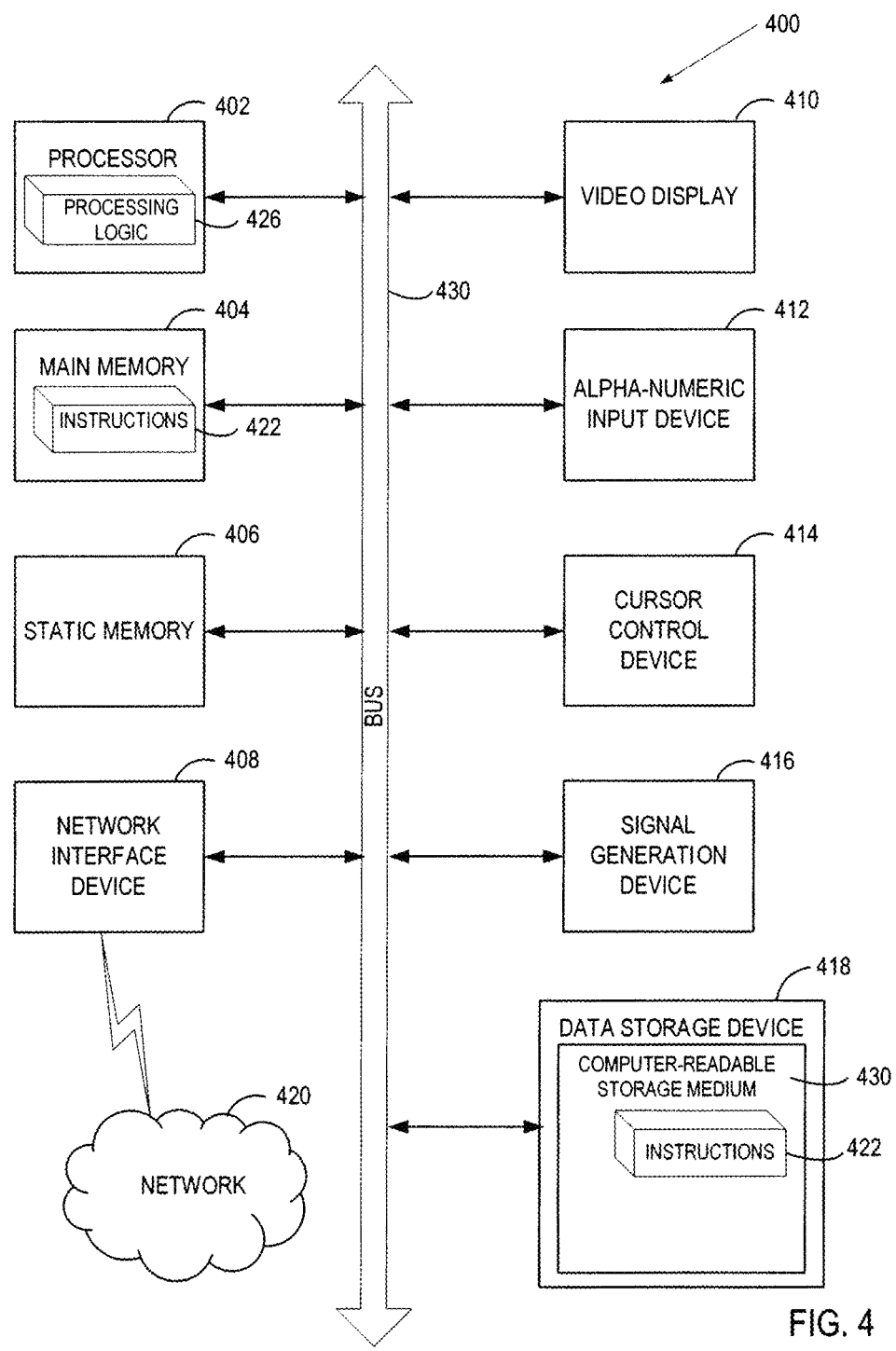
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting computer-accessible storage media. The software 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of a system and a method to dynamically create a smart form have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
creating, by a processing device, a graphical user interface (GUI) to present a questionnaire comprising a set of questions and a user interface, wherein the user interface provides an input interface for a user to input one or more answers for the set of questions;
displaying a first question in the set of questions via the GUI;
receiving, by the processing device, a first response to the first question via the user interface;
generating, by a rule engine of the processing device, a logic tree comprising nodes and branches, each of the nodes representing a question in the set of questions and each of the branches representing a response to a question in the set of questions;
storing, by the rule engine, the logic tree in a working memory of the rule engine;
identifying a node of the nodes in the logic tree correlating to the first response, the node comprising a follow-up question;
removing a portion of the logic tree stored in the working memory corresponding to a second node in the logic tree connected to a branch of the branches representing a second response that is not received via the GUI, wherein the removing the portion of the logic tree from the working memory increases available memory space of the working memory;
modifying, by the processing device, the GUI to present the follow-up question within the questionnaire;
modifying, by the processing device, the user interface to receive an answer from the user in view of the follow-up question; and
displaying the GUI and the user interface, as modified, via a display device.

2. The method of claim 1, further comprising:
modifying the GUI to present a different follow-up question in response to changing the response to the question.

3. The method of claim 1, wherein the follow-up question is logically related to the response received.

4. The method of claim 1, further comprising:
receiving one or more rules associated with the questionnaire and a plurality of potential follow-up questions;
asserting the response as a fact in the working memory of the rule engine; and
applying the one or more rules associated with the questionnaire to the fact to select the follow-up question from the plurality of potential follow-up questions.

5. The method of claim 1, wherein the rule engine constructs the logic tree to accumulate evidence.

6. The method of claim 1, wherein the questionnaire is a life insurance application form.

7. The method of claim 1, wherein a client processor is communicably coupled via a network to a server device on which a GUI module and the rule engine are executed, the client processor comprising the display device to render the GUI.

8. An apparatus comprising:
a memory; and
a processing device operatively coupled to the memory, the processing device to:
create a graphical user interface (GUI) to present a questionnaire comprising a set of questions and a user interface, wherein the user interface provides an input interface for a user to input one or more answers for the set of questions;
display a first question in the set of questions via the GUI;
receive a first response to the first question via the user interface;
generate, by a rule engine, a logic tree comprising nodes and branches, each of the nodes representing a question in the set of questions and each of the branches representing a response to a question in the set of questions;
store, by the rule engine, the logic tree in a working memory of the rule engine;
identify a node of the nodes in the logic tree correlating to the first response, the node comprising a follow-up question;

remove a portion of the logic tree stored in the working memory corresponding to a second node in the logic tree connected to a branch of the branches representing a second response that is not received via the GUI, wherein the processing device is further to remove the portion of the logic tree from the working memory to increase available memory space of the working memory;

modify the GUI to present the follow-up question within the questionnaire;

modify the user interface to receive an answer from the user in view of the follow-up question; and display the GUI and the user interface, as modified, via a display device.

9. The apparatus of claim 8, wherein the processing device is further to modify the GUI to present a different follow-up question in response to changing the answer to the question.

10. The apparatus of claim 8, wherein the follow-up question is logically related to the response received.

11. The apparatus of claim 8, wherein the processing device is further to:

receive one or more rules associated with the questionnaire and a plurality of potential follow-up questions;

assert the response as a fact in a working memory of a rule engine; and apply the one or more rules associated with the questionnaire to the fact to select the follow-up question from the plurality of potential follow-up questions.

12. The apparatus of claim 8, wherein the processing device is further to construct the logic tree in order to accumulate evidence.

13. The apparatus of claim 8, wherein the questionnaire is a life insurance application form.

14. The apparatus of claim 8, wherein a client processor is communicably coupled via a network to a server on which a rule engine is executed, the client processor comprising the display device to render the GUI.

15. A non-transitory computer-readable storage medium comprising instructions that, when executed by a processing device, cause the processing device to:

create, by the processing device, a graphical user interface (GUI) to present a questionnaire comprising a set of questions and a user interface, wherein the user interface provides an input interface for a user to input one or more answers for the set of questions;

display a first question in the set of questions via the GUI;

receive, by the processing device, a first response to the first question via the user interface;

generate, by a rule engine, a logic tree comprising nodes and branches, each of the nodes representing a question in the set of questions and each of the branches representing a response to a question in the set of questions;

store the logic tree in a working memory of the rule engine;

identify a node of the nodes in the logic tree correlating to the first response, the node comprising a follow-up question;

remove a portion of the logic tree corresponding to a second node in the logic tree stored in the working memory connected to a branch of the branches representing a second response that is not received via the GUI, wherein the processing device is further to remove the portion of the logic tree from the working memory to increase available memory space of the working memory;

modify, by the processing device, the GUI to present the follow-up question;

modify the user interface to receive an answer from the user in view of the follow-up question; and display the GUI and the user interface, as modified, via a display device.

16. The non-transitory computer-readable storage medium of claim 15, wherein the processing device further to modify the GUI to present a different follow-up question in response to changing the answer to the question.

17. The non-transitory computer-readable storage medium of claim 15, wherein the follow-up questions are logically related to the response received.

18. The non-transitory computer-readable storage medium of claim 15, wherein the processing device further to:

receive one or more rules associated with the questionnaire and a plurality of potential follow-up questions;

assert the response as a fact in the working memory of the rule engine; and apply the one or more rules associated with the questionnaire to the fact to select the follow-up question from the plurality of potential follow-up questions.

19. The non-transitory computer-readable storage medium of claim 15, wherein the processing device constructs the logic tree to accumulate evidence.

20. The non-transitory computer-readable storage medium of claim 15, wherein the questionnaire is a life insurance application form.

* * * * *